(12) United States Patent
Kamal et al.

(10) Patent No.: US 10,615,980 B2
(45) Date of Patent: *Apr. 7, 2020

(54) METHODS AND SYSTEMS FOR SECURELY STORING SENSITIVE DATA ON SMART CARDS

(71) Applicant: MasterCard International Incorporated, Purchase, NY (US)

(72) Inventors: Ashfaq Kamal, White Plains, NY (US); Sumeet Bhatt, Jericho, NY (US)

(73) Assignee: Mastercard International Incorporated, Purchase, NY (US)

( * ) Notice: Subject to any disclaimer, the term of this patent is extended or adjusted under 35 U.S.C. 154(b) by 277 days.

This patent is subject to a terminal disclaimer.

(21) Appl. No.: 15/422,611

(22) Filed: Feb. 2, 2017

(65) Prior Publication Data

US 2018/0219680 A1 Aug. 2, 2018

(51) Int. Cl.
| | |
|---|---|
| *H04L 9/32* | (2006.01) |
| *H04L 29/06* | (2006.01) |
| *G06F 21/53* | (2013.01) |
| *G06K 19/10* | (2006.01) |
| *H04L 9/14* | (2006.01) |

(Continued)

(52) U.S. Cl.
CPC ........... *H04L 9/3231* (2013.01); *G06F 21/53* (2013.01); *G06K 19/10* (2013.01); *H04L 9/0861* (2013.01); *H04L 9/14* (2013.01); *H04L 9/30* (2013.01); *H04L 9/3247* (2013.01); *H04L 63/061* (2013.01); *H04L 2209/16* (2013.01); *H04L 2209/56* (2013.01)

(58) Field of Classification Search
CPC combination set(s) only.
See application file for complete search history.

(56) References Cited

U.S. PATENT DOCUMENTS 8,918,900 B2 * 12/2014 Saito ................ G06K 19/0723
713/186
2004/0139340 A1 * 7/2004 Johnson ................ G06F 21/14
713/194

(Continued)

OTHER PUBLICATIONS

"PCT Notification of Transmittal of the International Search Report and Written Opinion", International Searching Authority, dated Mar. 15, 2018 (Mar. 15, 2018), for International Application No. PCT/US2018/014314, 14pgs.

(Continued)

*Primary Examiner* — Jason Chiang
(74) *Attorney, Agent, or Firm* — Buckley, Maschoff & Talwalkar LLC

(57) ABSTRACT

Methods and systems for permitting sensitive cardholder data to be securely stored in a regular storage element of a smart transaction card. In an embodiment, a transaction card processor of the smart transaction card installs a security application compatible with the operating system of the smart transaction card and that includes a white box cardlet. The transaction card processor uses a code protection process of the white box cardlet to obfuscate biometric reference template data stored in the regular memory of a biometric sensor, next stores the obfuscated biometric reference template data in the regular memory, and then re-obfuscates the biometric reference template data at a predetermined time interval.

11 Claims, 4 Drawing Sheets

(51) Int. Cl.
  *H04L 9/30*  (2006.01)
  *H04L 9/08*  (2006.01)

(56) References Cited

U.S. PATENT DOCUMENTS

| | | | |
|---|---|---|---|
| 2005/0138392 | A1 | 6/2005 | Johnson et al. |
| 2007/0220273 | A1* | 9/2007 | Campisi ............. G06K 9/00006 |
| | | | 713/186 |
| 2008/0155269 | A1* | 6/2008 | Yoshikawa ........... H04L 9/3231 |
| | | | 713/186 |
| 2012/0181333 | A1* | 7/2012 | Krawczewicz .... G06K 19/0718 |
| | | | 235/380 |
| 2014/0081857 | A1* | 3/2014 | Bonalle ................ G06Q 20/105 |
| | | | 705/41 |
| 2014/0210589 | A1 | 7/2014 | Grace |
| 2014/0365782 | A1* | 12/2014 | Beatson .................. G06F 21/32 |
| | | | 713/186 |
| 2015/0127553 | A1* | 5/2015 | Sundaram .......... G06K 19/0716 |
| | | | 705/72 |
| 2015/0371066 | A1* | 12/2015 | Weidinger ......... G06K 19/0722 |
| | | | 340/10.5 |
| 2016/0092871 | A1* | 3/2016 | Gordon ............... H04L 63/0414 |
| | | | 705/44 |
| 2016/0308371 | A1 | 10/2016 | Locke et al. |
| 2016/0381010 | A1* | 12/2016 | Bhandari ............ H04L 63/0435 |
| | | | 713/171 |
| 2017/0364418 | A1* | 12/2017 | Smirnov ............. G06F 11/1471 |

OTHER PUBLICATIONS

Marx, Ronald et al., "Increasing security and privacy in user-centric Identity Management: The IdM card approach", 2010 International Conference on P2P, Parallel, Grid, Cloud and Internet Computing, IEE, Nov. 4, 2010 (Nov. 4, 2010), XP031831042, ISBN: 978-0-7695-4237-9, DOI: 10.1109/3PGCIC.2010.78, (pp. 459-464, 6 total pages).

* cited by examiner

METHODS AND SYSTEMS FOR SECURELY STORING SENSITIVE DATA ON SMART CARDS

FIELD OF THE INVENTION

Embodiments generally relate to systems and processes that permit sensitive cardholder data to be securely stored in a regular storage element of a smart transaction card. In particular, obfuscation and white box processes are provided to a smart transaction card for use in protecting a consumer's sensitive data which is stored in a regular memory, and for use to protect applications that execute on the smart transaction card from tampering and/or hacking by vandals.

BACKGROUND

Due to the convenience provided, credit cards, debit cards, bank cards, store cards, identification cards, reward cards, and/or other types of plastic transaction cards (or cards made of other types of suitable materials) have gained wide acceptance by consumers or cardholders throughout the world. Such transaction cards have been used as an alternative to cash, and some can also be used to initiate and carry out 24-hour banking services. Most conventional transaction cards consist of a rectangular plastic carrier having cardholder identification information and/or account information embossed thereupon. In addition, the card carrier typically includes a magnetic stripe encoded with consumer account information. Examples of consumer account information that are encoded on the magnetic snipe include, but are not limited to, cardholder identification data, account number data, transaction identification number data, and secret identifying code data. In some systems, consumer data stored on the card is encrypted to make counterfeiting more difficult. However, vandals and/or hackers have stolen consumers' sensitive financial data and/or cardholder identification data from magnetic stripe cards, and then have used that data to fabricate counterfeit plastic transaction cards that may be used to make fraudulent purchases.

In order to combat payment card fraud, smart transaction cards (such as "EMV" cards, which stands for "EuroPay," "MasterCard" and "Visa") have been developed. The smart transaction cards include electronic circuitry and secure storage devices, and are configured for electronic communications with reader devices. For example, some EMV payment cards include near-field communication (NFC) circuitry which enables a proximity reader device to communicate with the EMV payment card when the EMV payment card is in near the proximity reader without any contact between them. Such smart transaction cards may also be configured to permit the proximity reader to query the smart transaction card for information stored on the smart transaction card, and/or to extract required information to complete a purchase transaction or other activity. However, smart transaction cards have also been prone to instances of information theft and/or identity theft by vandals, hackers or other persons who illicitly utilize a remote card reader or scanner within range of the smart transaction card of an unsuspecting cardholder.

In an attempt to further combat fraud, smart transaction cards incorporating one or more biometric sensors have been developed which purport to enhance security without undesirably hindering the easy use of the smart transaction card by a cardholder. Such smart transaction cards have proven to be somewhat effective against identity theft and payment, debit, and credit card fraud, but require an increase in circuitry and memory space. However, adding memory space to a smart transaction card can be expensive and thus add to the costs of manufacturing smart transaction cards.

Thus, it would be desirable to provide methods and systems for securely storing biometric data and/or other sensitive cardholder data and/or smart transaction card applications on regular memory in a manner that prevents hacker attacks (such as reverse engineering attacks) and/or identity theft and/or payment card fraud at a reasonable cost.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments, wherein.

DETAILED DESCRIPTION

Figure 1:
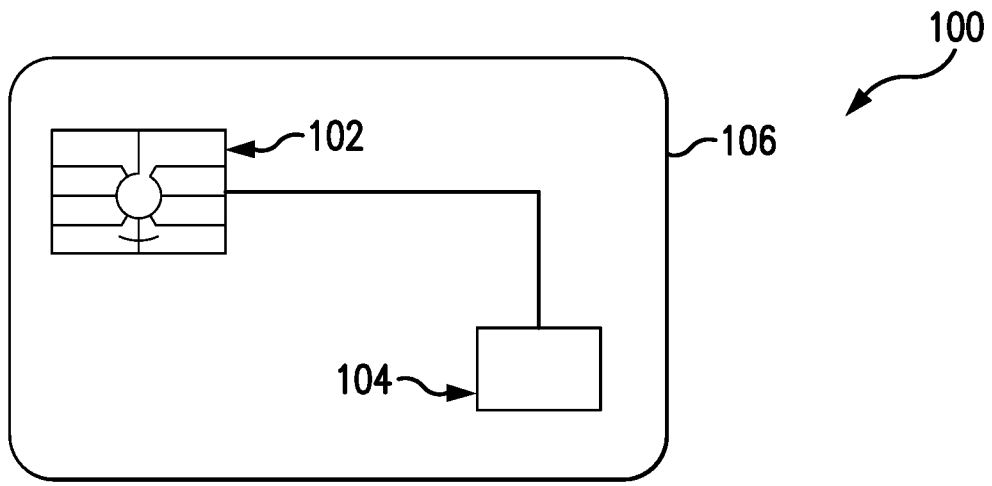
FIG. 1 is a block diagram of a secure self-authenticating smart transaction card according to some embodiments of the disclosure.

In general, and for the purpose of introducing concepts of novel embodiments described herein, presented are methods for providing obfuscation and white box functionality to transaction cards having at least one biometric sensor in order to protect sensitive cardholder data stored in a regular memory of the biometric sensor, and to protect applications that execute on the transaction card from tampering and/or hacking by vandals and/or hackers. In particular, the open nature of the biometric sensor memory device makes the software and/or data stored on these open devices vulnerable to attacks by software hackers or attackers. In particular, an attacker can gain control over the execution platform and/or the software implementations of such an open memory device. For example, an attacker or hacker could obtain and then analyze the binary code of a fingerprint application and/or the corresponding memory pages of one or more software applications during execution, which the attacker may utilize to intercept system calls, to tamper with the binary and its execution, and/or to enable the attacker to use hacking or attack tools, such as debuggers and emulators to obtain sensitive cardholder data.

It has been recognized that it would be advantageous to use an open memory of a biometric sensor to store cardholder biometric data in order to minimize the cost of manufacturing a smart transaction card that includes such biometric sensors. Thus, in accordance with some embodiments, a white box "cardlet" is provided for the purposes of thwarting attackers and/or hackers from successfully hacking or vandalizing the operations of the biometric sensor and/or obtaining sensitive cardholder data stored in the regular memory associated with the biometric sensor of the smart transaction card. For example, the white box cardlet may be in the form of a Java Card (which is the tiniest of Java platforms targeted for embedded devices), which refers to a software technology that permits Java-based applications or applets to run securely on small memory footprint devices such as smart cards. Thus, in some implementations, the white box cardlet includes a plurality of functionalities configured for obfuscating data stored in the regular memory, and/or for sensing attacks on the smart transaction card so that such attacks can be prevented, and/or so that security measures can be taken when needed. The white box cardlet may include, for example, cryptography processes that can operate as a special purpose code generator that turns a given cipher into a robust representation. For example, operations on a secret key can be combined with random data and code in a manner to provide a representation wherein the random data cannot be distinguished from key information so that a hacker cannot discern the key.

In some embodiments, the white box cardlet may be provided to software developers by a payments processing entity, such as MasterCard International Incorporated, for incorporating into their smart transaction card applications. For example, a developer of a biometric user authorization application (which may be developed by a third party entity, such as an issuing bank of the smart transaction card) can incorporate the white box cardlet into the biometric user authorization application for use in obfuscating sensitive consumer data such as biometric template data of the cardholder on the smart transaction card. In general, a consumer or cardholder would be unaware of the functionalities of the white box cardlet executing on his or her smart transaction card. However, such a white box cardlet would permit sensitive consumer data, such as a consumer's biometric data (for example, finger print data, facial recognition data, voice data, breath data, and the like), along with cryptographic keys and/or secret keys, to be securely stored in regular memory associated with the biometric sensor of the smart transaction card. In particular, methods described herein utilize cryptographic processes to obfuscate data before storing that data in the regular memory associated with the biometric sensor and/or to obfuscate software applications associated with smart transaction card functions such as biometric authentication.

Furthermore, because a determined hacker or attacker, given time and resources, could eventually decrypt the obfuscated sensitive data and/or software applications, in some implementations the cardholder's sensitive data is re-obfuscated at predetermined time intervals so as to prevent vandals and/or software hackers from successfully decrypting the obfuscated sensitive data. For example, it may be determined that, based on the cryptographic processes utilized in a given implementation of a white box cardlet and/or smart transaction card, that an experienced attacker or hacker could obtain the consumer's biometric data from a smart transaction card within one month. In such cases, the methods disclosed herein may include a trusted application manager server computer that communicates with the smart transaction card, re-obfuscates the consumer's sensitive data, and updates the consumer's root key at predetermined time intervals. For example, the consumer's sensitive data may be re-obfuscated every three weeks and the consumer's root key may be updated every two weeks, or both functions may occur at that same time interval (or other time intervals). Such processing could occur, for example, at the same time as smart transaction card processing for a purchase transaction that occurs on or after a predetermined amount of time has passed. In addition, one or more of the encryption algorithms, which have been used to encrypt the consumer's sensitive data, may also be obfuscated. Accordingly, the methods and systems described herein ensure the security of the cryptographic assets present and/or stored on the consumer's smart transaction card even when those cryptographic assets are subjected to white-box attacks by hackers and/or vandals.

A number of terms will be used herein. The use of such terms are not intended to be limiting, but rather are used for convenience and ease of exposition. For example, as used herein, the term "user" may be used interchangeably with the term "consumer" and/or the with the term "cardholder," and these terms are used herein to refer to a consumer, person, individual, business or other entity. Cardholders own (or are authorized to use) a financial account such as a payment card account (i.e., a credit card and/or debit card account) or some other type of account (such as a loyalty card account or mass transit access account). In addition, the term "payment card account" may include a credit card account, a debit card account, and/or a deposit account or other type of financial account that an account holder or cardholder may access. Moreover, as used herein the terms "payment card system" and/or "payment network" refer to a system and/or network for processing and/or handling purchase transactions and related transactions, which may be operated by a payment card system operator such as MasterCard International Incorporated, or a similar processor system or entity. In some embodiments, the term "payment card system" may be limited to systems in which member financial institutions (such as banks) issue payment card accounts to individuals, businesses and/or other entities or organizations. In addition, the terms "payment system transaction data" and/or "payment network transaction data" or "payment card transaction data" or "payment card network transaction data" refer to transaction data associated with payment or purchase transactions that have been processed over a payment network or payment system. For example, payment system transaction data may include a number of data records associated with individual payment transactions (or purchase transactions) of cardholders that have been processed over a payment card system or payment card network. In some embodiments, payment system transaction data may include information that identifies and/or authenticates a cardholder (such as biometric data associated with the cardholder), data that identifies and/or authenticates a cardholder's payment device and/or payment account, a transaction date and time, a transaction amount, merchandise or services that have been purchased, and/or information identifying a merchant and/or a merchant category.

Throughout this disclosure, examples associated with financial transactions such as purchase transactions will be described. However, those skilled in the art will appreciate that embodiments of a smart transaction card that includes a biometric sensor and a white box cardlet may be used with desirable results to protect sensitive data and/or software functionality associated with other types of applications and/or transactions, such as transactions permitting a cardholder access to a building and/or for online transactions which allow entry into a social gaming environment and the like. The white box cardlet may also be configured, for example, to secure an internet session between the user's smart transaction card and a merchant's server computer using code obfuscation in a manner to prevent "man in the middle attacks." For example, the white box cardlet may obfuscate the time of occurrence of the session so that it is unclear to a hacker as to exactly when the internet connection was set up so as to ensure code integrity.

Reference will now be made in detail to various novel embodiments and/or implementations, examples of which are illustrated in the accompanying drawings. It should be understood that the drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of these embodiments may be practiced without some or all of the specific details. In other instances, well-known process operations have not been described in detail in order not to unnecessarily obscure novel aspects.

FIG. 1 is a block diagram illustrating components of a secure self-authenticating smart transaction card 100 (or chip card) in accordance with some embodiments. As shown, the secure self-authenticating smart transaction card 100 includes a card access module 102 operably connected to a biometric module 104 and encompassed within a plastic carrier 106. The plastic carrier 106 may have the dimensions of a conventional credit card or debit card, and the card access module 102 may include components that securely store and process information required for conducting a transaction with the smart transaction card 100. In some implementations, to initialize a transaction the cardholder first uses the biometric module 104 for authentication purposes before the card access module 102 is permitted to process and/or provide the required information and/or data for conducting a transaction. Thus, in some embodiments, the biometric module 104 is configured to first receive biometric data input from the cardholder or user, compare it to biometric template data that is stored in a regular storage device of the biometric module, and if the received biometric data matches the biometric template data then permit the card access module 102 to communicate with a reader device.

Referring again to FIG. 1, in some implementations, the biometric module 104 is a fingerprint sensor or fingerprint scanner. However, various other types of biometric sensors could be utilized, including, but not limited to a retina scanner, an iris scanner, a face sensor (which may include a digital camera), a biochemical sensor, an audio sensor, and the like. Each such biometric sensor may be configured to handle and/or manage biometric data capture, biometric data storage, and/or biometric data matching processes. In the case of a secure self-authenticating smart transaction card 100 including a fingerprint sensor, a user swipes or scans his or her finger across a scanner (not shown) of the fingerprint sensor 104, and then the data from the user's fingerprint scan is compared to fingerprint template data stored in the memory of the fingerprint sensor 104. If a match occurs, then the transaction information stored within the card access module 102 is unlocked for use. Thus, the user will be able to use the secure self-authenticating smart transaction card 100 to conduct a transaction only if the user's scanned fingerprint data can be matched to stored fingerprint template data. In addition, in implementations according to the present disclosure, the user's fingerprint data and various software applications for authenticating the user are protected by utilizing one or more obfuscation techniques and/or white box functions to prevent tampering and/or hacking by vandals and/or hackers. Such security features ensure that lost or stolen smart transaction cards cannot be abused by unauthorized users because in order to access the information, programs, or other data items in the smart transaction card that are necessary to conduct transactions, the smart transaction card 100 must first self-authenticate or self-validate the user's identity.

Figure 2:
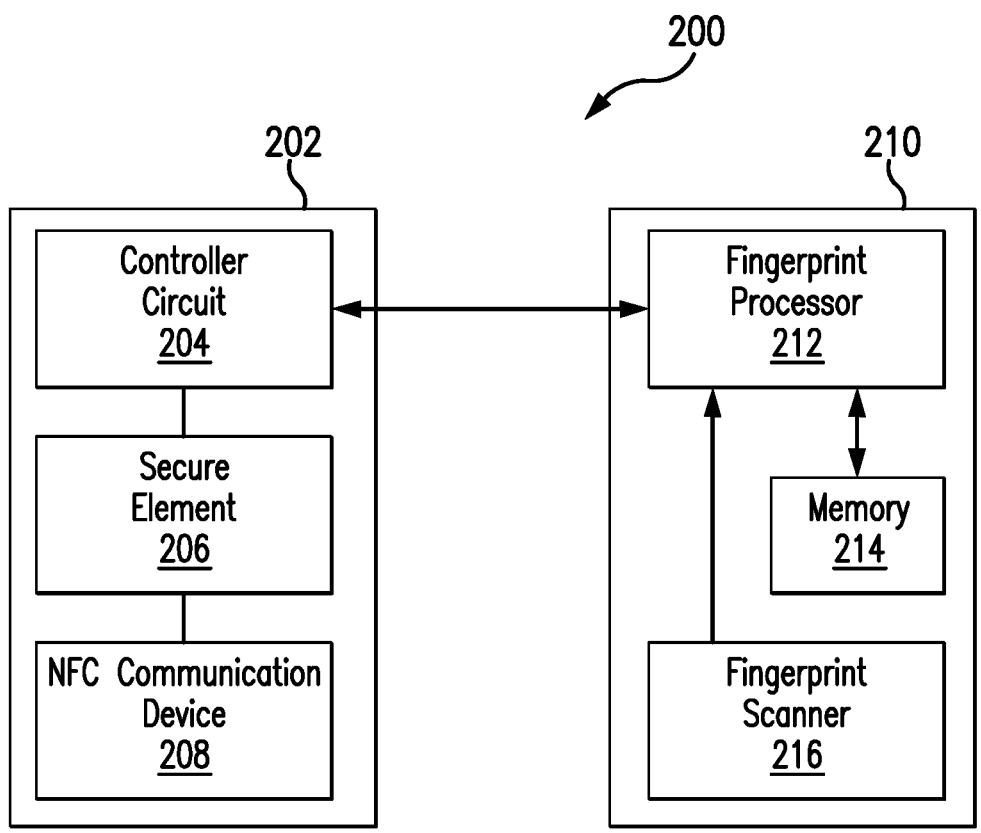
FIG. 2 is a block diagram of an embodiment of a secure self-authenticating smart transaction card architecture in accordance with some embodiments of the disclosure.

FIG. 2 is a block diagram of an embodiment of a secure self-authenticating smart transaction card architecture 200 in accordance with some embodiments. In some implementations, the card access module 202 includes a microcontroller 204 with a contact pad (not shown) that is operably connected to a secure element 206. In some implementations, the secure element 206 securely stores transaction applications (such as near-field communication (NFC) payment applications), sensitive financial data of the cardholder, and the like. As shown, the secure element 206 is also operably connected to an NFC communication device 208, which may include an antenna (not shown) that facilitates wireless communication between a terminal device (for example, a dedicated smart card reader device, or a mobile device that is NFC-enabled and includes an application that can read data from the smart card) and the smart transaction card. The card access module 202 is configured for allowing access to the smart transaction card, for example, by a smart card reader or by an application that emulates a smart card reader, and the module itself may or may not be visible from the surface of the transaction card.

FIG. 2 also illustrates a biometric sensor 210 operably connected to the card access module 202. In some embodiments, the biometric sensor 210 is a fingerprint sensor that includes a fingerprint microprocessor 212 operably connected to a regular memory 214 and operably connected to a fingerprint scanner 216 (which may be, for example, a capacitive scanner or ultrasonic pulse sensor). In some embodiments, the card access module 202 and the biometric sensor 210 are two separate integrated circuit (IC) chips.

After access to the information on the smart transaction card is authorized by the authorization process involving the biometric scanner 216, communication and resource management components of the smart transaction card may be configured to communicate using any of a variety of standard protocols. For example, the smart transaction card may be configured to securely communicate with an external terminal via a reader device using ISO 7816 and/or ISO 14443 protocols. In some implementations, proprietary communication protocols may be used. In addition, in some embodiments data transfer and resource sharing (for example, power, ground, and/or clock resources) depend upon the fingerprint processor 212 matching fingerprint data, which is input by the authorized user(s) of the smart transaction card by pressing or swiping a finger upon or past the fingerprint scanner 216, with fingerprint template data stored in the memory 214. When a match occurs, then the fingerprint processor 212 instructs the controller circuit 214 to switch the transaction card to an ON state such that access to, or communication of, the information contained on the smart transaction card is permitted. Of course, the smart transaction card remains in an OFF state when a match does not occur, for example if the fingerprint data is from the scan of an unauthorized person's finger and/or results from a faulty finger swipe of the user and thus does not match fingerprint template data stored in the memory 216.

Figure 3:
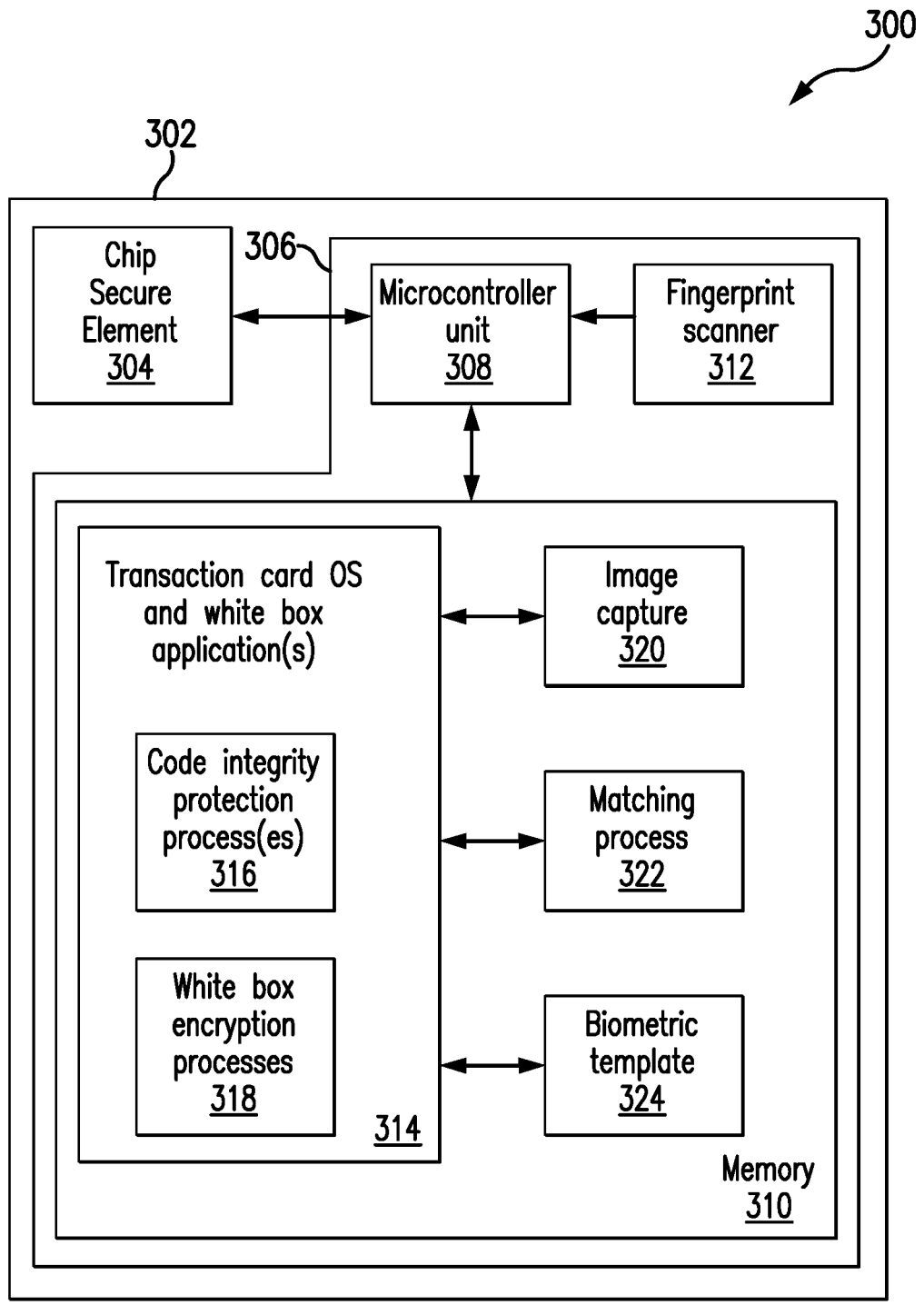
FIG. 3 is a functional block diagram of a secure, self-authenticating smart transaction card having a chip secure element operably connected to at least one biometric sensor according to an embodiment of the disclosure.

FIG. 3 is a functional block diagram 300 of a secure, self-authenticating smart transaction card 302 having a chip secure element 304 (which can be an EMV element or EMV chip) operably connected to at least one biometric sensor 306 in accordance with embodiments described herein. In this embodiment, the self-authenticating smart transaction card 302 is configured as a smart transaction card that includes an EMV secure element 304 and a fingerprint sensor 306. The fingerprint sensor 306 includes a microcontroller unit 308 operably connected to a regular memory device 310 and to a fingerprint scanner 312. The regular memory device 310 includes the transaction card operating system (OS) and a white box applet (or white box cardlet) 314, a code and integrity protection process 316, and one or more white box encryption process(es) 318. Also included in the memory device 310 are an image capture process 320, a matching process 322, and a biometric reference template 324.

In some embodiments, the code and integrity protection process(es) 316 and white box encryption processes 318 are white-boxed cyphers. In addition, the white box applet and card operating system software 314, the image capture process 320, the matching process 322, and the biometric reference template 324 may all be code protected to make it very difficult for a vandal or hacker to obtain any sensitive data from the memory 310 of the fingerprint sensor 306. In particular, the white box applet 314, code and integrity protection processes 316 and white box encryption process(es) 318 provide at least one of code protection, code obfuscation, and white box cryptography services at run time to protect the card operating system software, image capture software 320, matching process software 322 and biometric template data 324 from being stolen or otherwise misappropriated by hackers and/or vandals. In particular, the cardholder's fingerprint template data, which is used to authenticate the cardholder during a transaction, is encrypted and then stored in the regular memory 310 using white box cryptography to foil hackers. Thus, in some implementations, the white box cardlet may include one or more of a secure key generation and provisioning application, a jailbreak sensing application, a binary signature verification application, an anti-debug protection application, a library cross-checking application, and/or an anti-method swizzling application. It should be understood, however, that the white box functions may include less than or more than these applications, which may depend upon criteria such as, for example, the smart transaction card operating system and/or the type of application and/or type of data being protected and/or obfuscated. Use of these protective and/or security processes and/or service permits the storing of the cardholder's biometric reference data (such as a fingerprint template) onto regular memory of the biometric sensor to alleviate and/or solve the memory size constraint problem associated with storing and/or utilizing biometric data on a smart transaction card.

Figure 4:
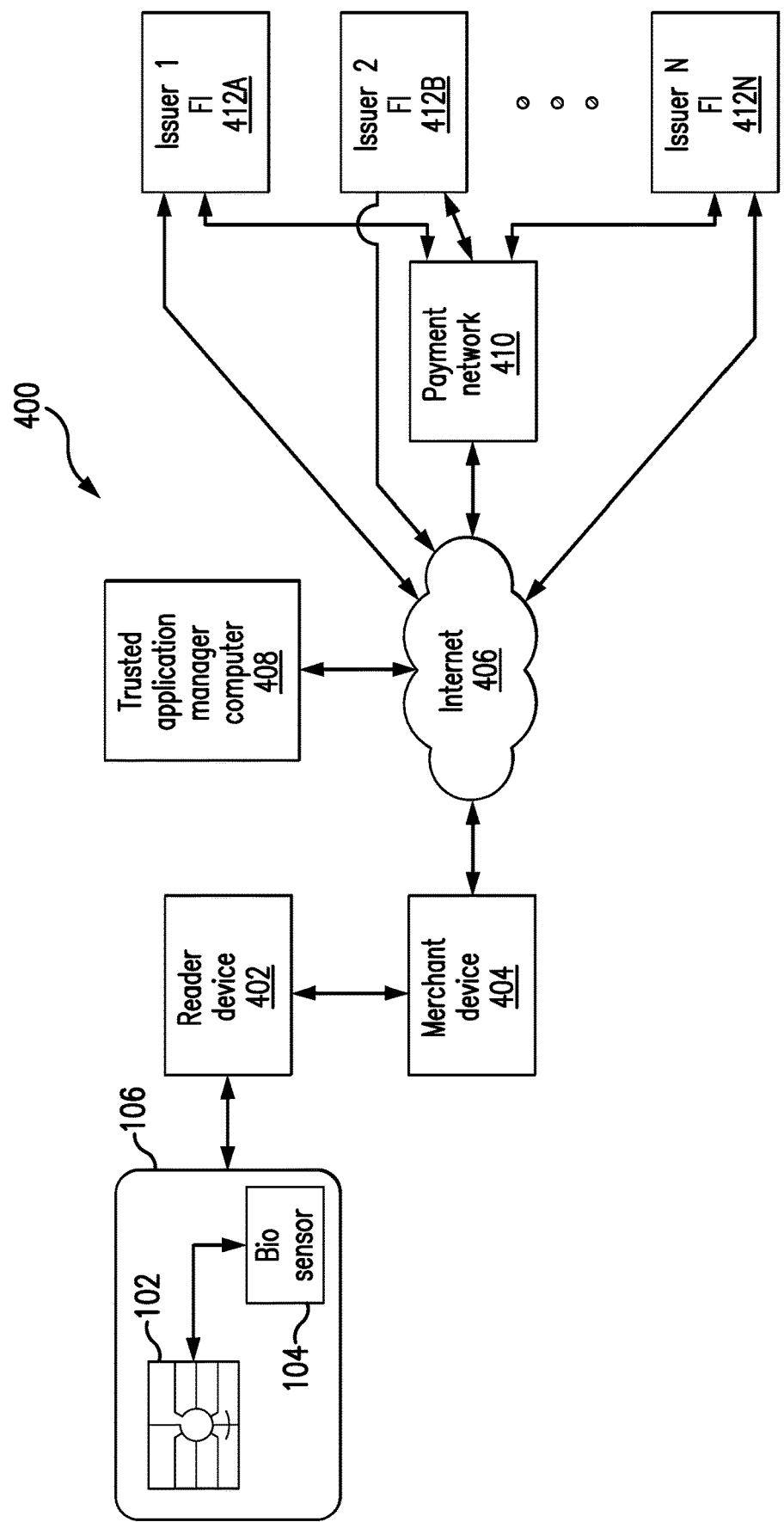
FIG. 4 is a block diagram of a portion of a transaction system to illustrate a transaction process involving a secure self-authenticating smart transaction card in accordance with some embodiments of the disclosure.

FIG. 4 is a block diagram of a portion of a transaction system 400 to illustrate a transaction process involving a secure self-authenticating smart transaction card 106 in accordance with the present disclosure. The smart transaction card 106 in this example is operable to perform a secure user or cardholder authentication process. The transaction system 400 includes a number of devices and/or components and/or entities which interact to conduct a transaction, such as a purchase transaction, that involves a user or cardholder authentication process. One or more components may also provide updates and/or information and/or data to other components. In addition, it should be understood that, for ease of understanding, FIG. 4 illustrates only one transaction card 106 along with one proximity reader device 402, a merchant device 404, a trusted application manager computer 408, and a payment network 410, but in practice a large number of such devices and/or components (wherein one or more may include one or more computers or computer networks including, for example, a plurality of interconnected server computers) may be involved to form such a transaction system 400.

Referring again to FIG. 4, a user or cardholder may utilize his or her secure self-authenticating smart transaction card 106 having a card access module 102 and a biometric sensor 104 to wirelessly interact with a proximity reader device 402 that is operably connected to a merchant device 404. The merchant device 404 is also operably connected via the Internet 406 to a trusted application manager computer 408 and to a payment network 410. The payment network 408 is in turn operably connected to a plurality of issuer financial institutions (FIs) computers 412A, 412B to 412N. In addition, the issuer FI computers may be operably connected to some of the other components, such as the trusted application manager computer 408, via the Internet 406.

The trusted application manager computer 408 may be owned and/or operated by an application services provider such as, but not limited to, Apple Inc., Google Inc., Amazon.com, Inc., Microsoft Inc., payment card processors such as MasterCard International Incorporated, nationwide banks, regional banks, and/or other financial institutions and the like, and may provide, for example, various online services (such as remote payment services) to consumers and/or merchants, and/or may provide one or more websites which offer applications that can be downloaded. For example, one or more of the issuer FI computers 412A to 412N may download a white box cardlet from the trusted application manager computer 408 for incorporating into their smart transaction card applications. In particular, an issuer FI may develop a biometric user authorization application and incorporate one or more white box cardlet functions into that biometric user authorization application for implementation in their smart transaction cards. The white box cardlet could be operable to obfuscate sensitive consumer data of the issuer FI's cardholders, such as biometric template data of those cardholders, and to protect the code integrity of applications residing on the smart transaction card, such as purchase transaction software. Thus, all software component logic involved in processing biometric data capture, biometric data matching, and biometric template data storage can be code obfuscated and code integrity protected using the white box technology.

Accordingly, during a transaction requiring user or cardholder authentication to proceed, the biometric sensor 104 of the smart transaction card may first obtain biometric data from the user, decrypt biometric template data stored in the sensor memory, and attempt to match the user biometric data to the decrypted biometric template data. (The biometric template data of the cardholder may have been generated and stored in the regular memory of the biometric sensor 104 during a cardholder authentication enrollment and device registration process, and such a registration process may occur, for example, when the user first provides financial data to request issuance of a smart transaction card from an issuing FI 412A to 412N. Enrollment may take place at an issuer FI's place of business and involve the user providing one or more biometric samples, such as fingerprints, via a biometric sensor and/or scanner for storing on the smart transaction card). Returning to the example above, if a match occurs between the biometric data obtained from the user and the decrypted biometric template data, then the biometric sensor 104 transmits a positive user authentication message to the card access module 102. The card access module 102 then initiates communications with the proximity reader device 402. Such a user biometric authentication process may advantageously enhance and/or speed up transaction processing because the user authentication processing is handled by the consumer's smart transaction card 106 instead of requiring authentication data to be transmitted to and verified by, for example, a remote server computer operated by one of the issuer FIs 412A-412N.

Figure 5:
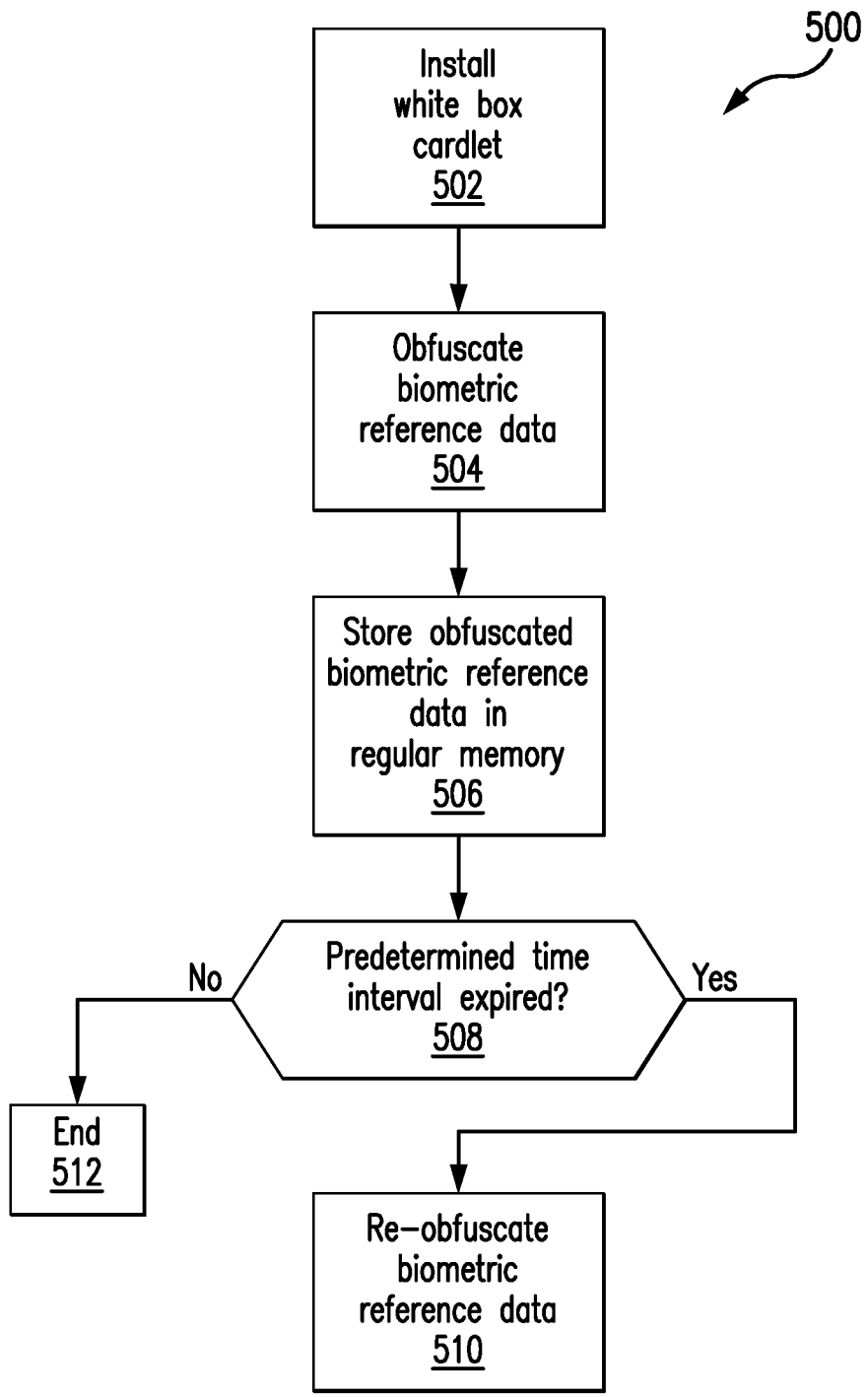
FIG. 5 is a flowchart illustrating a process for providing protection to a smart transaction card in accordance with methods described herein.

FIG. 5 is a flowchart illustrating a process 500 for providing protection to a smart transaction card in accordance with methods described herein. The process begins when a transaction card processor of a smart transaction card installs 502 a security application, which may be provided by a trusted application manager computer. The security application is compatible with the smart transaction card operating system (the card OS) and, in some embodiments includes a white box cardlet. The transaction card processor next utilizes a code protection process of the white box cardlet to obfuscate 504 biometric reference template data that has already been stored in a regular memory of the biometric sensor of the smart transaction card. The transaction card processor then stores 506 the obfuscated biometric reference template data in the regular memory of the biometric sensor. Next, when a predetermine time interval expires 508, the transaction card processor re-obfuscates 510 the biometric reference template data. The predetermined time interval may be determined by a third party entity, such as a software research lab, and instructions may be included in the white box cardlet software (which has been installed on the smart transaction card) configured to cause the transaction card processor to re-obfuscate the biometric reference template data (and possibly other data and/or processes) when the predetermined time interval expires as measured from the time of occurrence of a previous transaction. Referring again to FIG. 5, if the transaction card processor determines in step 508 that the predetermined time interval has not yet expired, then the process ends 512 without re-obfuscation occurring.

In some embodiments, the process for providing protection to a smart transaction card also includes the transaction card processor running a code integrity protection process of the white box cardlet to monitor one or more transaction applications, which may be configured to execute when conducting transactions. When an attack is detected, then the process may include the transaction card processor transmitting a security alert message to a proximity reader device during transaction processing. Examples of transaction applications include, but are not limited to, a biometric data capture process, a biometric data matching process, and a white box process of the white box cardlet.

In some implementations, the process for providing protection to a smart transaction card also includes the transaction card processor receiving, via a proximity reader, instructions from a trusted application manager computer. For example, instructions to reset a user root key may be received, and then in response the smart transaction card resets the user's root key. In addition, the process may include obfuscating, by running the code protection process, at least one cardholder authentication application. In addition, some implementations of the white box cardlet may include white box functions that can deploy sensitive logic in white box binary, and/or that can obfuscate encryption algorithms, and/or obfuscate public key algorithms. Thus, in some cases the white box functions can include one or more of a secure key generation and key provisioning application, a jailbreaking application, a binary signature verification application, an anti-debug protection application, a library cross-checking application, and an anti-swizzling application.

Thus, since sensitive data associated with or representative of sensitive cardholder information, such as the consumer's payment credentials and the consumer's biometric identification data, needs to be securely stored on the smart transaction card in order to prevent tampering with, or the stealing of, such data by software hackers and/or the like vandals, the methods described herein may include code protection and/or obfuscation techniques. Such functions can be used to encrypt the sensitive data resulting in obfuscated data which can then be stored in regular (or nonsecure) memory of the biometric sensor.

It has been recognized, however, that given time and resources, a determined hacker or attacker will eventually be able to decrypt the obfuscated data stored on a smart transaction card. Thus, the disclosed methods may also include re-obfuscating the sensitive data, which may occur at a predetermined time (and/or at predetermined intervals) so as to prevent vandals and/or software hackers from successfully decrypting or obtaining the obfuscated sensitive data. In some embodiments, the predetermined time interval can be an estimate provided by a software lab (or the like third party entity) of the time it may take an experienced and/or determined hacker to overcome the defenses provided by the white box cardlet. Thus, in some implementations, for example, the consumer's root key is updated and/or the consumer's sensitive data stored in the memory of the biometric sensor are re-obfuscated at a suggested or estimated predetermined time in order to thwart any hacking attempts that may be ongoing. In addition, the disclosed methods can be used to obfuscate one or more of the encryption algorithms which have been used to encrypt the consumer's sensitive data. Thus, in some embodiments, the white box cardlet on a consumer's smart transaction card may include code or instructions configured to a biometric processor and/or a controller circuit of the smart transaction card to update and/or re-obfuscate the sensitive data at a predetermined time interval. For example, such updates and/or re-obfuscation functions could occur once every three weeks as measured from the time of a particular transaction. Accordingly, in some other implementations the updating and/or re-obfuscation of the sensitive data may occur when the consumer or user presents his or her smart transaction card at a proximity reader device during a transaction that is occurring after a predetermined time interval has expired as measured from a predetermined date.

As mentioned above, it is contemplated that secure self-authenticating smart cards utilizing a biometric sensor and the disclosed processes in accordance with the present disclosure may also be used as access control cards, for example, to limit and/or monitor cardholder access to secured areas, such as company buildings, mass transit terminals, airport boarding gate areas, and the like. In addition, such smart transaction cards may also be used as financial payment and/or cash cards, as medical information cards (for example, to securely and confidentially store a cardholder's identification information, family contact information, prescription drug information, health information, and/or other critical, private, and medical information). Moreover, such secure smart cards according to the present disclosure may be used as combination cards, such as a combination government identification and payment card, and/or may be used as accounting control cards for payments made to entities such as government agencies, companies, banks, utility companies and the like entities. Furthermore, such secure self-authenticating smart cards may be used to account for transactions in real time by securities traders of securities, so that such traders and their trades can be monitored to ensure that out-of-control, unauthorized, or insider trades do not go undetected. In addition, the secure self-authenticating smart card may permit the creation of transportation identification and payment cards for subways, buses, trains, planes and the like, and/or driver identification cards for transporters of hazardous goods and the like.

As will be appreciated based on the foregoing specification, the above-described examples of the disclosure may be implemented using computer programming or engineering techniques including computer software, firmware, hardware, middleware or any combination or subset thereof. Any such resulting program, having computer-readable code, may be embodied or provided within one or more non-transitory computer-readable media, thereby making a computer program product, i.e., an article of manufacture, according to the examples discussed herein. For example, suitable non-transitory computer-readable media may include, but is not limited to, a fixed drive, diskette, optical disk, magnetic tape, bubble memory, flash memory, semiconductor memory such as read-only memory (ROM), Nano memory cell(s), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", applets or code) may include machine instructions for a programmable processor, and may be implemented in a high-level procedural and/or object-oriented programming language, and/or in an assembly language and/or machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. In addition, one or more of the steps may not be required for performance in some embodiments.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for protecting user data stored on a smart transaction card, comprising:
    installing, by a transaction card processor of a smart transaction card, a security application provided by a trusted application manager computer, the security application compatible with an operating system of the smart transaction card and comprising a white box cardlet;
    utilizing, by the transaction card processor, a code protection process of the white box cardlet to obfuscate biometric reference template data stored in a regular memory of a biometric sensor;
    storing, by the transaction card processor, the obfuscated biometric reference template data in the regular memory of the biometric sensor;
    re-obfuscating, by the transaction card processor, the biometric reference template data at a first predetermined time interval; and
    updating, by the transaction card processor during a transaction requiring user authentication, a root key at a second predetermined interval that is different than the first predetermined time interval, wherein the first predetermined time interval and the second predetermined time interval are estimates provided by a third party for thwarting a hacker attack.

2. The method of claim 1, wherein the at least one transaction application comprises at least one of a biometric data capture process, a biometric data matching process, and a white box process of the white box cardlet.

3. The method of claim 1, further comprising, prior to re-obfuscating the biometric reference template data, obfuscating, by the transaction card processor running the code protection process, at least one cardholder authentication application.

4. The method of claim 1, wherein the white box cardlet comprises white box functions that at least one of deploys sensitive logic in white box binary, obfuscates encryption algorithms, and obfuscates public key algorithms.

5. The method of claim 4, wherein the white box functions comprise at least one of a secure key generation and key provisioning application, a jailbreaking application, a binary signature verification application, an anti-debug protection application, a library cross-checking application, and an anti-swizzling application.

6. The method of claim 1, wherein the smart transaction card comprises a fingerprint sensor and the biometric template data is cardholder fingerprint data.

7. The method of claim 1, further comprising:
    detecting, by the transaction card processor running a code integrity protection process of the white box cardlet, an attack on a transaction application executing during a transaction with a proximity reader device; and
    transmitting, by the transaction card processor to the proximity reader device, a security alert message.

8. A smart transaction card, comprising:
    a card access module comprising a secure element operably connected to a microcontroller and to a near-field communication device; and
    a biometric sensor operably connected to the card access module, wherein the biometric sensor comprises a biometric processor operably connected to a regular memory and to a biometric scanner;
    wherein the secure element of the card access module comprises instructions configured to cause the microcontroller to:
        install a security application which is compatible with an operating system of the smart transaction card and comprising a white box cardlet;
        utilize a code protection process of the white box cardlet to obfuscate biometric reference template data stored in the regular memory of the biometric sensor;
        store the obfuscated biometric reference template data in the regular memory of the biometric sensor;

re-obfuscate the biometric reference template data at a predetermined time interval;
re-obfuscate the biometric reference template data at a first predetermined time interval; and
update, during a transaction requiring user authentication, a root key at a second predetermined interval that is different than the first predetermined time interval, wherein the first predetermined time interval and the second predetermined time interval are estimates provided by a third party for thwarting a hacker attack.

9. The smart transaction card of claim 8, wherein the biometric sensor is a fingerprint sensor and the biometric template data is cardholder fingerprint data.

10. The smart transaction card of claim 8, wherein the secure element comprises, prior to the instructions for re-obfuscating the biometric reference template data, instructions configured to cause the microcontroller to obfuscate at least one cardholder authentication application by running the code protection process.

11. The smart transaction card of claim 8, wherein the secure element of the card access module comprises further instructions configured to cause the microcontroller to:
detect, utilizing a code integrity protection process of the white box cardlet, an attack on a transaction application executing during a transaction with a proximity reader device; and
transmit a security alert message to the proximity reader device.

* * * * *